R. M. CAROTHERS.
VOLTAGE REGULATING SYSTEM.
APPLICATION FILED FEB. 14, 1917.
1,290,908.
Patented Jan. 14, 1919.
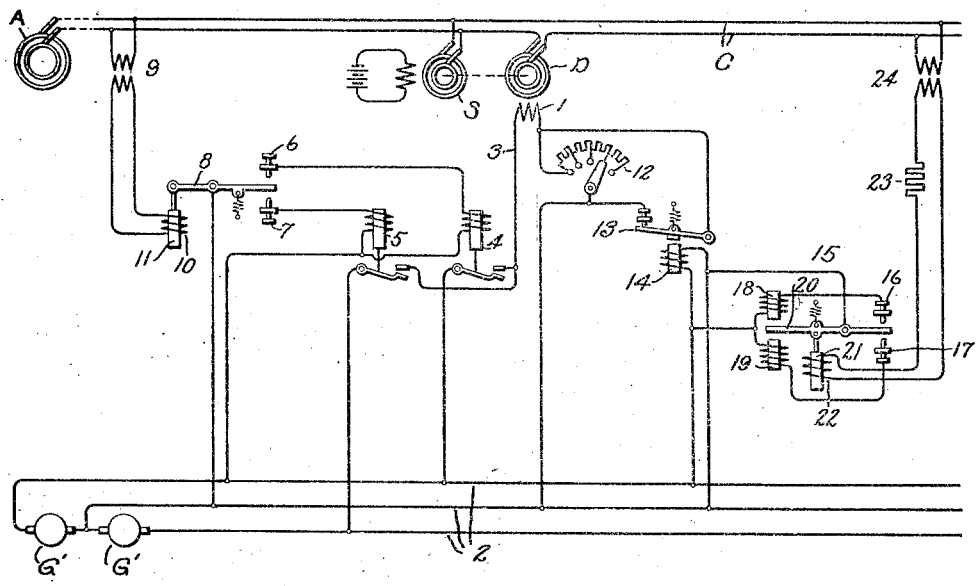
Inventor:
Robert M. Carothers,
by *Albert G. Davis*
His Attorney.

UNITED STATES PATENT OFFICE.

ROBERT M. CAROTHERS, OF SCHENECTADY, NEW YORK, ASSIGNOR TO GENERAL ELECTRIC COMPANY, A CORPORATION OF NEW YORK.

VOLTAGE-REGULATING SYSTEM.

1,290,908.           Specification of Letters Patent.          Patented Jan. 14, 1919.

Application filed February 14, 1917. Serial No. 148,668.

*To all whom it may concern:*

Be it known that I, ROBERT M. CAROTHERS, a citizen of the United States, residing at Schenectady, in the county of Schenectady, State of New York, have invented certain new and useful Improvements in Voltage-Regulating Systems, of which the following is a specification.

My invention relates to a system for automatically regulating the voltage of a load circuit which is connected through a series booster to the main source of electrical energy.

One object of my invention is to provide improved automatic means for regulating the voltage upon a load circuit by controlling the direction and amount of the voltage generated in a dynamo electric machine which is connected in series between the load circuit and the main source of electrical energy.

Another object of my invention is to provide improved automatic means, jointly controlled by the voltage on the supply side and the voltage on the load side of a dynamo electric machine, which is connected in series between the load circuit and the main source of electrical energy, for regulating the voltage of the load circuit on the load side of said machine by controlling the direction and amount of the voltage generated in said machine.

Another object of my invention is to provide automatic means for regulating the voltage of a load circuit by controlling the direction and amount of the voltage generated in an alternating current generator which is connected in series between the load circuit and the main source of alternating current energy.

Other objects of my invention will appear from the following description when considered in connection with the accompanying drawing, in which the single figure is a diagrammatic showing of one embodiment of my invention.

In said figure a load circuit C is adapted to be supplied with electrical energy from a source of alternating current A. Between the source of alternating current and the load circuit C is serially connected an alternating current generator D which is adapted, depending upon the direction of its field, either to function as a booster or as a bucker. The voltage of the generator D is maintained at the same frequency as the voltage of the source A and in phase or phase opposition thereto, by driving said generator through a synchronous motor S, supplied with energy from the source A. Any other means for driving the generator D which will maintain these conditions may, however, be employed.

The auxiliary generator D is provided with a field winding 1 which is adapted to be energized from a three-wire system 2. One terminal of said field winding is permanently connected to the neutral wire of the three-wire system, whereas the other terminal of said field winding is adapted to be connected, depending upon the voltage on the supply side of said auxiliary generator, by means of the conductor 3 either to the positive or the negative wires of the three-wire system. To this end, electromagnetically operated selecting switches 4 and 5 are employed. The winding of the switch 4 is connected between a stationary contact 6 and the positive wire of the three-wire system, and the winding of the switch 5 is connected between a stationary contact 7 and the positive wire of the three-wire system. A movable contact member 8, the movement of which is controlled by the voltage adjacent to and on the supply side of the auxiliary generator by means of a transformer 9, winding 10 and core 11, is electrically connected to the neutral wire of the three-wire system, and is adapted, when said voltage is below a predetermined value, to engage with the stationary contact 6, and thereby place the winding of the switch 4 across the positive and neutral wires of the three-wire system, and is adapted, when said voltage is above a predetermined value, to engage with the stationary contact 7 and thereby place the winding of the switch 5 across the positive and neutral wires of the three-wire system. When the voltage on the supply side of the auxiliary generator is below a predetermined value, and the switch 4 closed, said generator will act to boost the voltage, whereas when said voltage is above a predetermined value, and the switch 5, said generator will act to buck the voltage. The other end of the field winding is adapted to be connected to the neutral wire of the three-wire system through a circuit having a portion of the resistance 12 serially connected therein, or through a circuit including said portion of the resistance 12 and the short-circuiting switch 13, connected in parallel. The value of the current flowing in the field winding 1, and hence the voltage of the auxiliary generator is adapted to be regulated by means of the short-circuiting switch 13 which, when open, will cause the voltage of the auxiliary generator to fall to a predetermined low value, and when closed will cause the voltage of the generator to rise to a predetermined high value.

The minimum value of the voltage which the generator D is capable of developing must be selected so that it does not exceed the voltage change, either side of the main value, necessary to operate the movable contact member 8.

The switch 13 is operated by means of the electromagnet 14, the winding of which is connected across the positive and neutral wires of the three-wire system. Said winding is adapted alternately to be energized and short-circuited by means of the regulator 15 which operates in response to voltage changes on the load circuit on the load side of the auxiliary generator D. The regulator 15 comprises stationary contacts 16 and 17 connected, in series with the windings of the electromagnets 18 and 19 respectively, to one terminal of the winding of the electromagnet 14. A movable contact member 20 is electrically connected to another terminal of the winding of the electromagnet 14, and is adapted to engage with the stationary contacts 16 and 17. The movable contact member 20 is adapted to be influenced by the electromagnets 18 and 19 upon the energization thereof, for a purpose hereinafter explained. The movable contact member 20 is connected to a core 21 which coöperates with a winding 22, which is connected, through a resistance 23, to the secondary of the transformer 24, the primary of which is connected across the load circuit C on the load side of the auxiliary generator. The three-wire system, as shown, is supplied with energy from the generators G', but of course any other known means for supply current to said system may be employed.

As at present understood, the operation of the system is as follows: Assume the voltage on the supply side of the auxiliary generator D to be below the predetermined value, then, in the manner hereinbefore described, the auxiliary generator D will be caused to act as a booster with, let it be assumed, a minimum voltage. If the difference, between the voltage on the supply side of the auxiliary generator and the voltage which it is desired to maintain on the load side, is greater than the minimum voltage developed by said auxiliary generator, the voltage on the load side of said auxiliary generator will fall below the desired predetermined value, and will permit the movable contact member 20 to engage with the stationary contact 16, thereby short-circuiting the winding of the electromagnet 14 and permitting the short-circuiting switch 13 to close, whereupon the voltage of the auxiliary generator D will tend to rise. Upon the engagement of the movable contact member 20 and the stationary contact member 16, the electromagnet 18 is energized, with the result that it tends to disengage the movable contact member 20 from the stationary contact member 16, and hence causes the movable contact member 20 to vibrate independently of fluctuations in the voltage impressed upon the winding 22, as the voltage on the load side of the auxiliary generator approaches the desired value. The regulator 15 acts in conjunction with switch 13 and electromagnet 14, to regulate the voltage of the auxiliary generator to such a value that, when added to the voltage on the supply side of said generator, the desired voltage on the load side of said generator will result.

If the voltage on the supply side of the auxiliary generator exceeds a predetermined value, the auxiliary generator will be caused to act in the manner hereinbefore described, as a bucker, and the bucking voltage developed therein will be regulated by means of the switch 13, electromagnet 14 and the regulator 15 in substantially the manner already described. In this case, however, the movable contact 20 coöperates with stationary contact 17 to effect the control of the electromagnet 14.

Although my invention has been illustrated and described as applied to a single phase system, nevertheless it is not limited thereto but is also adapted to use in a polyphase system.

I conceive that various modifications of my invention may be made and I accordingly do not desire to be limited to the exact arrangement shown, but seek to cover, in the appended claims, all such modifications and arrangements as fall within the scope and spirit of my invention.

What I claim as new and desire to secure by Letters Patent of the United States, is:—

1. The combination with a circuit and a source of electrical energy adapted to be connected thereto, of automatic means for regulating the voltage thereof comprising an auxiliary source of voltage adapted to be inserted in series with said circuit, electroresponsive means for controlling the direction of the voltage of said auxiliary source with respect to the voltage of the main source, and independent electroresponsive means for controlling the value of the voltage of said auxiliary source.

2. The combination with a circuit and a source of electrical energy adapted to be connected thereto, of automatic means for regulating the voltage thereof comprising a generator adapted to be interpolated in said circuit and means, jointly controlled by the circuit voltages on opposite sides of the point at which said generator is connected to said circuit, for regulating the direction and value of the voltage developed by said generator.

3. The combination with a circuit and a source of electrical energy adapted to be connected thereto, of automatic means for regulating the voltage thereof comprising a generator adapted to be connected in series with said circuit, means, controlled by the circuit voltage on the source side of the point at which said generator is connected in said circuit, for reversing the generator field, and means, controlled by the circuit voltage on the other side at the point at which said generator is connected in said circuit, for regulating the voltage developed by said generator.

4. The combination with a circuit and a source of electrical energy adapted to be connected thereto, of automatic means for regulating the voltage thereof comprising a generator adapted to be connected in series in said circuit, means, controlled by the circuit voltage on the source side of the point at which said generator is connected in said circuit, for reversing the generator field, and vibratory means, controlled by the circuit voltage on the other side of the point at which said generator is connected in said circuit, for regulating the voltage developed by said generator.

5. The combination with a circuit and a source of electrical energy adapted to be connected thereto, of automatic means for regulating the voltage thereof comprising a generator adapted to be connected in series in said circuit, a three-wire system, means, controlled by the circuit voltage on the source side of the point at which said generator is connected in said circuit, for connecting the field winding of said generator alternatively between the neutral and positive wires or the neutral and negative wires of the three-wire system, and means, controlled by the circuit voltage on the other side of the point at which said generator is connected in said circuit, for regulating the voltage developed by said generator.

6. The combination with a circuit and a source of alternating current adapted to be connected thereto, of automatic means for regulating the voltage thereof comprising an alternating current generator adapted to be connected in series in said circuit, means, controlled by the circuit voltage on the source side of the point at which said generator is connected in said circuit, for reversing the generator field, and means, controlled by the circuit voltage on the other side of the point at which said generator is connected in said circuit, for regulating the voltage developed by said generator.

7. The combination with a circuit and a source of alternating current adapted to be connected thereto, of automatic means for regulating the voltage thereof comprising an alternating current generator adapted to be connected in series in said circuit, means, controlled by the circuit voltage on the source side of the point at which said generator is connected in said circuit, for reversing the generator field, and means, controlled by the circuit voltage on the other side of the point at which said generator is connected in said circuit, for regulating the voltage developed by said generator, and means for maintaining the frequency of the voltage of said generator the same as the frequency of the voltage of said source and for maintaining the voltage of said generator in phase or phase opposition to the voltage of said source.

In witness whereof, I have hereunto set my hand this 13th day of February 1917.

ROBERT M. CAROTHERS.

Copies of this patent may be obtained for five cents each, by addressing the "Commissioner of Patents, Washington, D. C."